United States Patent
Boyko et al.

[15] 3,683,148
[45] Aug. 8, 1972

[54] FABRICATION OF NUCLEAR FUEL ASSEMBLIES AND RESULTANT PRODUCT

[72] Inventors: Eugene S. Boyko, 720 Greenleaf Dr., Monroeville, Pa. 15146; Joseph Campbell, 10135 Pearl Street, Penn Hills, Pittsburgh, Pa. 15235

[22] Filed: May 5, 1970

[21] Appl. No.: 33,156

Related U.S. Application Data

[63] Continuation-in-part of Ser. No. 680,863, Nov. 6, 1967, abandoned.

[52] U.S. Cl..................................219/137, 176/79
[51] Int. Cl. ..............................................B23k 9/00
[58] Field of Search ......219/74, 75, 136, 137, 121 P; 176/68, 79; 29/428

[56] References Cited
UNITED STATES PATENTS

| | | |
|---|---|---|
| 3,004,189 | 10/1961 | Giannini.................219/121 P |
| 3,033,972 | 5/1962 | Stedman.................219/137 X |
| 3,045,108 | 7/1962 | Stone et al.................219/137 |
| 3,174,025 | 3/1965 | Johnson........................219/75 |
| 3,392,438 | 7/1968 | Coulter et al................176/79 |

*Primary Examiner*—C. L. Albritton
*Attorney*—A. T. Stratton and C. L. Freedman

[57] ABSTRACT

A nuclear fuel assembly has an end plug and is sealed except for a small diameter axial bore in the plug. The plug provides a collar around the outer end of the bore which when fused provides sufficient material to seal the bore. Before the bore is sealed the assembly is filled with an inert-gas at high pressure. An electric arc is then established between an electrode and the collar to melt the collar sufficiently to seal the bore.

8 Claims, 2 Drawing Figures

PATENTED AUG 8 1972 3,683,148

WITNESSES
Edwin L. Bander
James F. Young

INVENTORS
Eugene S. Boyko &
Joseph Campbell
BY
C. L. Freedman
ATTORNEY 3,683,148

FABRICATION OF NUCLEAR FUEL ASSEMBLIES AND RESULTANT PRODUCT

This is a continuation of application Ser. No. 680,863, filed Nov. 6, 1967, now abandoned.

BACKGROUND OF THE INVENTION

This invention relates to nuclear fuel assemblies and it has particular relation to apparatus and processes for fabricating nuclear fuel assemblies which are pressurized.

In nuclear reactors it is the practice to employ a plurality of nuclear fuel assemblies each comprising a tube containing nuclear fuel, the ends of the tube being sealed by plugs. Due to the pressure of the environment in which the assembly is located it is subject to high creep stresses and even to collapse.

DESCRIPTION OF THE PRIOR ART

Heretofore it has been proposed that a fuel assembly be evacuated to a pressure of the order of 0.1 torr and that helium be admitted at a low pressure thereafter to the fuel assembly. While it was in the low pressure helium environment the fuel assembly was then sealed. The purpose of the helium was to increase the heat transfer between the nuclear fuel and the exterior of the fuel container and to enable any leak through the container to be detected by spectrometer inspection. The final sealing was effected by an arc welding step which produced a circular weld uniting the periphery of a plug to the associated tube.

In the copending patent application of Harry M. Ferrari, Ser. No. 615,542, filed Feb. 13, 1967 and assigned to the same assignee several pressurizing techniques are mentioned. For example an internal pressure is developed by a thermally decomposable body located within the sealed fuel assembly during fabrication. When heated the body generates a gas such as carbon dioxide or a mixture of carbon dioxide and monoxide to pressurize the fuel assembly. The fuel assembly may be located in a pressurized water reactor in which the water may have a pressure of the order of 2,000 pounds per square inch. Typical dimensions are disclosed by Ferrari.

SUMMARY OF THE INVENTION

In accordance with the invention a plug of a nuclear fuel assembly is provided with an axial bore providing communication between the exterior and interior of the fuel assembly. The outer end of this bore is surrounded by a collar which when fused provides sufficient metal to seal the bore. Prior to such sealing the nuclear fuel assembly is placed in an enclosure which is first evacuated and then pressurized by an inert-gas to a substantial pressure such as a pressure in excess of 500 pounds per square inch (gauge). An electric arc then is established between an electrode aligned with the bore and the collar for the purpose of fusing the collar and sealing the bore.

It is therefore an object of the invention to provide an improved nuclear fuel assembly which is constructed with a high internal pressure.

It is also an object of the invention to provide an improved method for constructing a nuclear fuel assembly with a high internal pressure.

It is a further object of the invention to provide improved apparatus for practicing the method set forth in the preceding paragraph.

BRIEF DESCRIPTION OF THE DRAWING

Other objects of the invention will be apparent from the following description taken in conjunction with the accompanying drawings in which.

DESCRIPTION OF THE PREFERRED EMBODIMENTS

Figure 1:
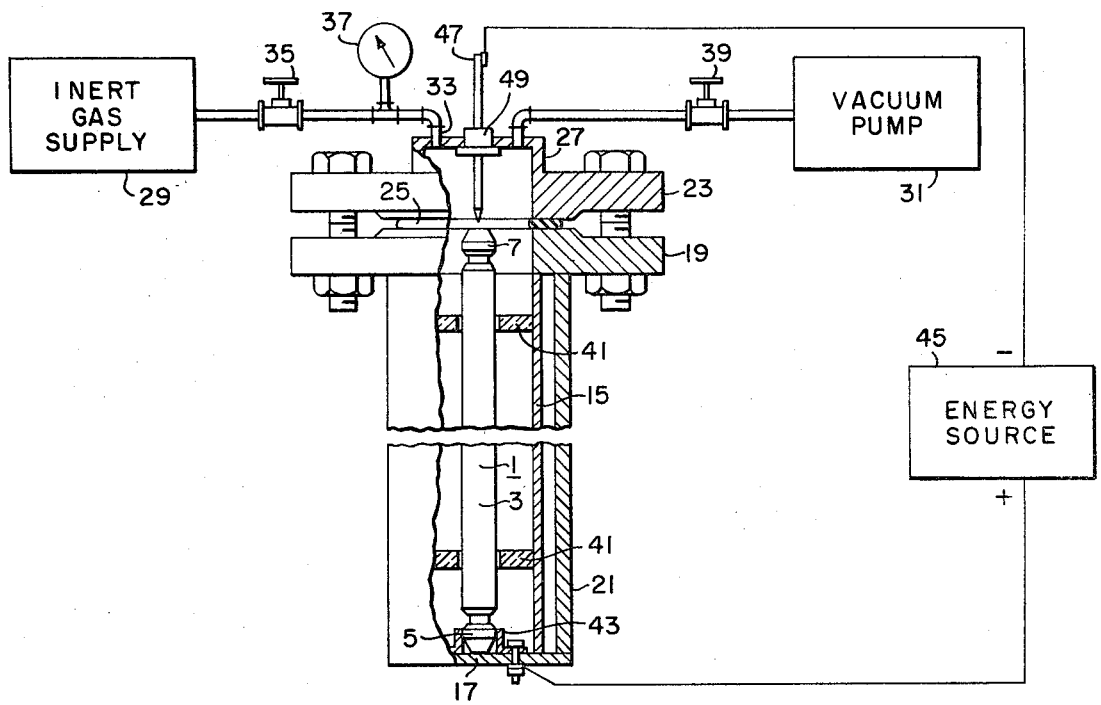
FIG. 1 is a schematic view with parts shown in elevation and with parts broken away of a nuclear fuel assembly and apparatus for pressurizing such assembly.

Referring to the drawing FIG. 1 shows a nuclear fuel assembly 1 comprising an elongated thin-walled tube 3 which contains nuclear fuel, such as fuel pellets of uranium oxide enriched with U-235. The tube 3 has a plug 5 sealing its lower end and a plug 7 located adjacent its upper end. The plug 5 may be secured to the tube 3 by means of a circular weld in a manner well understood in the art. The plug 7 is welded similarly to the tube 3.

The tube and plugs may be constructed of a zirconium-containing alloy. Such an alloy may contain by weight 1.2 to 1.7 percent tin, 0.07 to 0.20 iron, 0.05 to 0.15 chromium, 0.03 to 0.08 nickel and 97.87 to 98 zirconium. A specific alloy of this type may contain 1.5 tin, 0.12 iron, 0.10 chromium, 0.05 nickel with the balance being zirconium.

A suitable zirconium alloy containing a low nickel content may contain 1.2 to 1.7 tin, 0.18 to 0.24 iron, 0.07 to 0.13 chromium, 0.007 nickel with the balance being zirconium.

Stainless steel may also be employed for the tube and plugs.

In accordance with the invention the tube 3 and the plugs 5 and 7 are sealed while containing gas under a high pressure. Pressures in the range of 500 pounds per square inch to 1,900 pounds per square inch (gauge) have been employed with good results. As pointed out in the above-mentioned Ferrari application such pressurizing is particularly suitable for fuel assemblies to be employed in pressurized water reactors.

Under the conditions of use the contents of the tube 3 tend to expand. Preferably an initial pressure is selected such that at the end of the life of the nuclear fuel assembly the internal pressure does not exceed 2,000 to 2,200 pounds per square inch.

Figure 2:
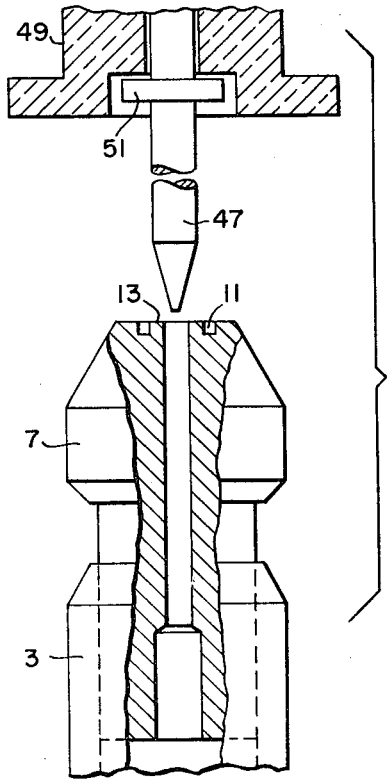
FIG. 2 is a detail view in elevation with parts broken away showing one end of a nuclear fuel assembly and an associated electrode as employed in the system of FIG. 1.

As shown in FIG. 2 the plug 7 is provided with an axial small-cross-section bore 9 which establishes communication between the exterior and interior of the fuel assembly. The bore may have a small diameter such as 0.04 inch, and the end of the plug 7 is provided with a circular groove 11 concentric with the bore 9. This grove may have a depth of the order of 0.025 to 0.03 inch and a width of the order of 0.020 to 0.030 inch. the groove defines a collar 13 which surrounds the outer end of the bore 9. When this collar is melted or fused it provides sufficient filler metal to fill or seal the outer end of the bore 9.

In order to pressurize the fuel assembly the assembly is placed in a pressurizing enclosure or chamber which includes a steel sleeve 15. The sleeve at its lower end is welded in sealed relationship to a steel disc 17. At its upper end the sleeve 15 is welded around the inner opening of a steel flange 19. As an additional safety measure an outer steel sleeve 21 may surround the sleeve 15 and may be welded to the disc 17 and the flange 19.

The enclosure is completed by a steel ring 23 which is bolted to the flange 19 with a suitable seal 25 located therebetween. The seal 25 may take the form of a highly polished stainless-steel ring. The ring 23 has its center closed by a steel cup 27.

The enclosure is suitably connected to an inert-gas supply 29 and a vacuum pump 31. In the specific embodiment of FIG. 1, a nipple 33 located in an opening provided in the cup 27 is connected by piping through a valve 35 to the inert-gas supply 29. A gauge 37 is provided for indicating the pressure within the enclosure.

In a similar manner the cup 27 is connected through a valve 39 to the vacuum pump 31.

The fuel assembly 1 is positioned concentrically within the sleeve 15 by means of suitable insulators 41. These insulators may be constructed of any suitable material such as porcelain or a fluorocarbon resin which is available under the trademark "Teflon." The plug 5 is releasably positioned in an electrical socket 43 which is secured to the disc 17 and which is connected through a suitable conductor to the positive terminal of a source of direct current 45.

An electrode 47 extends through an insulating bushing 49 which is secured to the cup 27 and has its lower end positioned adjacent the plug 7. The insulator may be made from a material similar to that employed for the insulators 41. The electrode 47 is connected to the negative terminal of the source 45. In order to assure retention of the electrode in position under the conditions of high pressure to which it is subjected a stainless steel collar 51 is welded to the electrode. In service the collar 51 is located adjacent the lower end of the bushing 49.

It will be noted that the electrode 47 is aligned with the fuel assembly 1. The electrode may be constructed of a thoriated tungsten electrode having a diameter of 0.062 inch and may contain for example two per cent by weight of thorium. The electrode is located adjacent the collar 13 to establish an arch gap between the electrode and the collar. As an example the electrode may have a tapered end positioned above the collar by a distance of the order of 10 mils.

The pressurizing gas should provide a good atmosphere for welding. Argon and helium are examples of suitable gases and helium is preferred. Helium has the additional advantage that it may be detected in a known manner by spectrometer inspection for the purpose of detecting leaks in the fuel assembly.

A procedure for pressurizing a nuclear fuel assembly now may be described. A loaded fuel assembly is placed within the sleeve 15 with the plug 5 inserted in the electric socket 17. The ring 23 then is bolted to the flange 19 for the purpose of compressing the seal 25 and establishing a completely sealed enclosure for the fuel assembly. If the electrode 47 is threaded through the bushing 49 or is otherwise adjustable it is then adjusted to establish a suitable arc gap between its tip and the adjacent collar 13. It will be assumed for present purposes that the electrode 47 is preset in the bushing 49 to establish the correct arc gap. If necessary the enclosure is now connected to the valves 35 and 39.

At this stage the valve 39 is opened and the vacuum pump 31 is operated to evacuate the enclosure to a pressure which may be of the order of 0.1 torr. The valve 39 is now closed and the valve 35 is opened to supply helium under pressure to the enclosure. The pressure is built up to the desired value which for example may be of the order of 1,000 pounds per square inch. At this stage the valve 35 is closed.

An arc next is formed between the electrode 47 and the collar 13. The arc may be struck or started in a conventional manner as by the application of a high frequency alternating current from the energy source 45 across the arc gap. Thereafter the direct current supplied by the energy source maintains the arc and heats the collar 13 to a temperature sufficient to fuse or melt the material of the collar. The melted metal of the collar bridges and seals the adjacent end of the bore 9. The current may be supplied to the arc for a predetermined time sufficient to assure completion of the sealing operation. As an example a current of the order of 60 amperes for one second has been found sufficient to provide a good seal. The completed fuel assembly now may be removed from the enclosure.

What we claim is:

1. The method of constructing a pressurized nuclear fuel unit the steps comprising, (a) assembling a predetermined quantity of nuclear fuel in an enclosure which enclosure is formed from a thin-walled elongated tube having an end plug welded to one end of the tube and another end plug welded to the opposite end of the tube, at least one of said end plugs having an opening extending from the interior to the exterior of the enclosure (b) placing at least a portion of the plug containing the opening within a sealed chamber (c) evacuating the sealed chamber and the interior of the enclosure (d) backfilling said sealed chamber with an inert gas to provide a predetermined pressure of said gas within the chamber and the interior of the enclosure (e) supplying a source of heat within the chamber adjacent the opening in the end plug for fusing the end plug adjacent the opening to establish a seal for said opening (f) removing the source of heat, (g) cooling the portion of the enclosure in the chamber (h) and thereafter removing the pressurized sealed unit from the chamber.

2. The method as claimed in claim 1 wherein said plug is an electroconductive fusible plug and said heating comprises striking a fixed electric arc with said plug as one electrode for the arc and fusing material with said fixed electric arc to fill said opening.

3. The method as claimed in claim 2 wherein said gas is selected from the group consisting of helium and argon, said enclosure being constructed by sealing a plug to one end of a tubular member having its other end closed, the plug having said opening formed as an axial opening therein, said gas being at a pressure substantially greater than atmospheric pressure, said enclosure being constructed of material selected from the group consisting of stainless steel and zirconium alloy.

4. The method of constructing a pressurized nuclear fuel unit the steps of comprising, (a) inserting nuclear fuel into a thin-wall elongated metal tube, (b) welding a separate metal plug to each end of the metal tube to form a container for the nuclear fuel, one of said plugs having an axial opening constituting the only communication path between the interior and exterior of the container, (c) inserting at least the metal plug having the axial opening in a sealed chamber, (d) evacuating the chamber and the interior of the container (e) backfilling the chamber and the interior of the container with an inert gas to establish a predetermined pressure of said gas therein, (f) fusing metal within said opening to hermetically seal said container, said fusing including the generation of an electric arc within said opening to establish metal fusing heat at the opening (g) terminating the generation of the electric arc, and cooling the contents of the chamber while under the influence of the inert gas.

5. The method as claimed in claim 4 wherein said inert gas is introduced into the container at a selected pressure in excess of atmospheric pressure, said selected pressure being such that the internal pressure of the container does not exceed 2,200 pounds per square inch throughout the useful life of the nuclear fuel assembly.

6. The method as claimed in claim 5 wherein said tube and said plugs are constructed of material selected from the group consisting of stainless steel and zirconium alloy.

7. The method as claimed in claim 5 wherein the plug having an axial opening has a collar around the opening, said fusing comprising the melting of metal in said collar to fill the opening.

8. In the method as claimed in claim 5 wherein said electric arc is established by extending a welding electrode through a wall of the chamber, the step of forming a collar on the portion of the electrode located within the chamber to prevent ejection of the electrode from the chamber.

* * * * *